(12) United States Patent
Barve et al.

(10) Patent No.: US 8,296,294 B2
(45) Date of Patent: Oct. 23, 2012

(54) METHOD AND SYSTEM FOR UNIFIED SEARCHING ACROSS AND WITHIN MULTIPLE DOCUMENTS

(75) Inventors: Rakesh Barve, Bangalore (IN); Sashikumar Venkataraman, Andover, MA (US)

(73) Assignee: Veveo, Inc., Andover, MA (US)

( * ) Notice: Subject to any disclaimer, the term of this patent is extended or adjusted under 35 U.S.C. 154(b) by 515 days.

(21) Appl. No.: 12/126,409

(22) Filed: May 23, 2008

(65) Prior Publication Data

US 2008/0313174 A1 Dec. 18, 2008

Related U.S. Application Data

(60) Provisional application No. 60/940,136, filed on May 25, 2007.

(51) Int. Cl.
*G06F 7/00* (2006.01)
*G06F 17/00* (2006.01)
(52) U.S. Cl. .......................... 707/727; 707/728; 715/200
(58) Field of Classification Search .................. None
See application file for complete search history.

(56) References Cited

U.S. PATENT DOCUMENTS

| | | | |
|---|---|---|---|
| 1,261,167 A | 4/1918 | Russell | |
| 4,760,528 A | 7/1988 | Levin | |
| 4,893,238 A | 1/1990 | Venema | |
| 5,224,060 A | 6/1993 | Ma et al. | |
| 5,337,347 A | 8/1994 | Halstead-Nussloch et al. | |
| 5,369,605 A | 11/1994 | Parks | |
| 5,487,616 A | 1/1996 | Ichbiah | |
| 5,623,406 A | 4/1997 | Ichbiah | |
| 5,635,989 A | 6/1997 | Rothmuller | |
| 5,805,155 A | 9/1998 | Allibhoy et al. | |
| 5,818,437 A | 10/1998 | Grover et al. | |
| 5,828,420 A | 10/1998 | Marshall et al. | |
| 5,828,991 A | 10/1998 | Skiena et al. | |
| 5,859,662 A | 1/1999 | Cragun et al. | |
| 5,880,768 A | 3/1999 | Lemmons et al. | |
| 5,896,444 A | 4/1999 | Perlman et al. | |
| 5,912,664 A | 6/1999 | Eick et al. | |
| 5,937,422 A | 8/1999 | Nelson et al. | |
| 5,945,928 A | 8/1999 | Kushler et al. | |
| 5,953,541 A | 9/1999 | King et al. | |
| 6,005,565 A | 12/1999 | Legall et al. | |
| 6,005,597 A | 12/1999 | Barrett et al. | |
| 6,006,225 A | 12/1999 | Bowman et al. | |
| 6,008,799 A | 12/1999 | Van Kleeck | |

(Continued)

FOREIGN PATENT DOCUMENTS

EP 1143691 10/2001

(Continued)

OTHER PUBLICATIONS

U.S. Appl. No. 11/939,086, Ramakrishnan et al.

(Continued)

*Primary Examiner* — Pierre Vital
*Assistant Examiner* — Berhanu Mitiku
(74) *Attorney, Agent, or Firm* — Wilmer Cutler Pickering Hale & Dorr LLP.

(57) ABSTRACT

A user-interface system and method for searching among multiple documents and searching for subsections within individual documents using a single search interface on an input-constrained user device having a screen and a keypad.

12 Claims, 8 Drawing Sheets

U.S. PATENT DOCUMENTS

| | | | |
|---|---|---|---|
| 6,011,554 A | 1/2000 | King et al. | |
| 6,075,526 A | 6/2000 | Rothmuller | |
| 6,133,909 A | 10/2000 | Schein et al. | |
| 6,184,877 B1 | 2/2001 | Dodson et al. | |
| 6,189,002 B1 | 2/2001 | Roitblat | |
| 6,204,848 B1 | 3/2001 | Nowlan et al. | |
| 6,260,050 B1 | 7/2001 | Yost et al. | |
| 6,266,048 B1 | 7/2001 | Carau, Sr. | |
| 6,266,814 B1 | 7/2001 | Lemmons et al. | |
| 6,269,361 B1 | 7/2001 | Davis et al. | |
| 6,286,064 B1 | 9/2001 | King et al. | |
| 6,307,548 B1 | 10/2001 | Flinchem et al. | |
| 6,307,549 B1 | 10/2001 | King et al. | |
| 6,383,080 B1 | 5/2002 | Link et al. | |
| 6,392,640 B1 | 5/2002 | Will | |
| 6,466,933 B1 | 10/2002 | Huang et al. | |
| 6,529,903 B2 | 3/2003 | Smith | |
| 6,543,052 B1 | 4/2003 | Ogasawara | |
| 6,564,213 B1 | 5/2003 | Ortega et al. | |
| 6,594,657 B1 | 7/2003 | Livowsky et al. | |
| 6,600,496 B1 | 7/2003 | Wagner et al. | |
| 6,614,422 B1 | 9/2003 | Rafii et al. | |
| 6,614,455 B1 | 9/2003 | Cuijpers et al. | |
| 6,615,248 B1 | 9/2003 | Smith | |
| 6,622,148 B1 | 9/2003 | Noble et al. | |
| 6,708,336 B1 | 3/2004 | Bruette | |
| 6,721,954 B1 | 4/2004 | Nickum | |
| 6,732,369 B1 | 5/2004 | Leftwich et al. | |
| 6,734,881 B1 | 5/2004 | Will | |
| 6,757,906 B1 | 6/2004 | Look et al. | |
| 6,772,147 B2 | 8/2004 | Wang | |
| 6,785,671 B1 | 8/2004 | Bailey et al. | |
| 6,839,702 B1 | 1/2005 | Patel et al. | |
| 6,839,705 B1 | 1/2005 | Grooters | |
| 6,850,693 B2 | 2/2005 | Young et al. | |
| 6,865,575 B1 | 3/2005 | Smith | |
| 6,907,273 B1 | 6/2005 | Smethers | |
| 6,965,374 B2 | 11/2005 | Villet et al. | |
| 7,013,304 B1 | 3/2006 | Schuetze et al. | |
| 7,136,854 B2 | 11/2006 | Smith | |
| 7,158,971 B1 * | 1/2007 | Bascom | 1/1 |
| 7,225,180 B2 | 5/2007 | Donaldson et al. | |
| 7,225,184 B2 | 5/2007 | Carrasco et al. | |
| 7,225,455 B2 | 5/2007 | Bennington et al. | |
| 7,293,231 B1 | 11/2007 | Gunn et al. | |
| 7,679,534 B2 | 3/2010 | Kay et al. | |
| 7,683,886 B2 | 3/2010 | Willey | |
| 7,712,053 B2 | 5/2010 | Bradford et al. | |
| 8,037,068 B2 * | 10/2011 | Halevy et al. | 707/736 |
| 2002/0042791 A1 | 4/2002 | Smith et al. | |
| 2002/0059066 A1 | 5/2002 | O'Hagan | |
| 2002/0083448 A1 | 6/2002 | Johnson | |
| 2002/0133481 A1 | 9/2002 | Smith et al. | |
| 2003/0011573 A1 | 1/2003 | Villet et al. | |
| 2003/0014753 A1 | 1/2003 | Beach et al. | |
| 2003/0023976 A1 | 1/2003 | Kamen et al. | |
| 2003/0037043 A1 | 2/2003 | Chang et al. | |
| 2003/0046698 A1 | 3/2003 | Kamen et al. | |
| 2003/0066079 A1 | 4/2003 | Suga | |
| 2003/0067495 A1 | 4/2003 | Pu et al. | |
| 2003/0097661 A1 | 5/2003 | Li et al. | |
| 2003/0237096 A1 | 12/2003 | Barrett et al. | |
| 2004/0021691 A1 | 2/2004 | Dostie et al. | |
| 2004/0046744 A1 | 3/2004 | Rafii et al. | |
| 2004/0049783 A1 | 3/2004 | Lemmons et al. | |
| 2004/0073432 A1 | 4/2004 | Stone | |
| 2004/0073926 A1 | 4/2004 | Nakamura et al. | |
| 2004/0078815 A1 | 4/2004 | Lemmons et al. | |
| 2004/0078816 A1 | 4/2004 | Johnson | |
| 2004/0078820 A1 | 4/2004 | Nickum | |
| 2004/0083198 A1 | 4/2004 | Bradford et al. | |
| 2004/0093616 A1 | 5/2004 | Johnson | |
| 2004/0111745 A1 | 6/2004 | Schein et al. | |
| 2004/0128686 A1 | 7/2004 | Boyer et al. | |
| 2004/0194141 A1 | 9/2004 | Sanders | |
| 2004/0216160 A1 | 10/2004 | Lemmons et al. | |
| 2004/0220926 A1 | 11/2004 | Lamkin et al. | |
| 2004/0261021 A1 | 12/2004 | Mittal et al. | |
| 2005/0015366 A1 | 1/2005 | Carrasco et al. | |
| 2005/0071874 A1 | 3/2005 | Elcock et al. | |
| 2005/0079895 A1 | 4/2005 | Kalenius et al. | |
| 2005/0086234 A1 | 4/2005 | Tosey | |
| 2005/0086691 A1 | 4/2005 | Dudkiewicz et al. | |
| 2005/0086692 A1 | 4/2005 | Dudkiewicz et al. | |
| 2005/0129199 A1 | 6/2005 | Abe | |
| 2005/0192944 A1 | 9/2005 | Flinchem | |
| 2005/0210020 A1 | 9/2005 | Gunn et al. | |
| 2005/0210402 A1 | 9/2005 | Gunn et al. | |
| 2005/0223308 A1 | 10/2005 | Gunn et al. | |
| 2005/0240580 A1 | 10/2005 | Zamir et al. | |
| 2005/0246324 A1 | 11/2005 | Paalasmaa et al. | |
| 2005/0283468 A1 | 12/2005 | Kamvar et al. | |
| 2006/0044277 A1 | 3/2006 | Fux et al. | |
| 2006/0059044 A1 | 3/2006 | Chan et al. | |
| 2006/0075429 A1 | 4/2006 | Istvan et al. | |
| 2006/0098899 A1 | 5/2006 | King et al. | |
| 2006/0101499 A1 | 5/2006 | Aravamudan et al. | |
| 2006/0101503 A1 | 5/2006 | Venkataraman et al. | |
| 2006/0101504 A1 | 5/2006 | Aravamudan et al. | |
| 2006/0112162 A1 | 5/2006 | Marot et al. | |
| 2006/0136379 A1 | 6/2006 | Marino et al. | |
| 2006/0156233 A1 | 7/2006 | Nurmi | |
| 2006/0163337 A1 | 7/2006 | Unruh | |
| 2006/0167676 A1 | 7/2006 | Plumb | |
| 2006/0167859 A1 | 7/2006 | Verbeck Sibley et al. | |
| 2006/0176283 A1 | 8/2006 | Suraqui | |
| 2006/0206815 A1 | 9/2006 | Pathiyal et al. | |
| 2006/0242607 A1 | 10/2006 | Hudson | |
| 2006/0256078 A1 | 11/2006 | Flinchem et al. | |
| 2006/0274051 A1 | 12/2006 | Longe et al. | |
| 2007/0005563 A1 | 1/2007 | Aravamudan | |
| 2007/0016862 A1 | 1/2007 | Kuzmin | |
| 2007/0027852 A1 | 2/2007 | Howard et al. | |
| 2007/0050337 A1 | 3/2007 | Venkataraman et al. | |
| 2007/0061317 A1 | 3/2007 | Ramer et al. | |
| 2007/0061321 A1 | 3/2007 | Venkataraman | |
| 2007/0061753 A1 | 3/2007 | Ng et al. | |
| 2007/0061754 A1 | 3/2007 | Ardhanari et al. | |
| 2007/0074131 A1 | 3/2007 | Assadollahi | |
| 2007/0088681 A1 | 4/2007 | Aravamudan et al. | |
| 2007/0094024 A1 | 4/2007 | Kristensson et al. | |
| 2007/0130128 A1 | 6/2007 | Garg et al. | |
| 2007/0143567 A1 | 6/2007 | Gorobets | |
| 2007/0150606 A1 | 6/2007 | Flinchem et al. | |
| 2007/0182595 A1 | 8/2007 | Ghasabian | |
| 2007/0219984 A1 | 9/2007 | Aravamudan et al. | |
| 2007/0219985 A1 | 9/2007 | Aravamudan et al. | |
| 2007/0226649 A1 | 9/2007 | Agmon | |
| 2007/0240045 A1 | 10/2007 | Fux et al. | |
| 2007/0255693 A1 | 11/2007 | Ramaswamy et al. | |
| 2007/0260703 A1 | 11/2007 | Ardhanari et al. | |
| 2007/0266021 A1 | 11/2007 | Aravamudan et al. | |
| 2007/0266026 A1 | 11/2007 | Aravamudan et al. | |
| 2007/0266406 A1 | 11/2007 | Aravamudan et al. | |
| 2007/0271205 A1 | 11/2007 | Aravamudan et al. | |
| 2007/0276773 A1 | 11/2007 | Aravamudan et al. | |
| 2007/0276821 A1 | 11/2007 | Aravamudan et al. | |
| 2007/0276859 A1 | 11/2007 | Aravamudan et al. | |
| 2007/0288457 A1 | 12/2007 | Aravamudan et al. | |
| 2008/0071771 A1 | 3/2008 | Venkataraman et al. | |
| 2008/0086704 A1 | 4/2008 | Aravamudan | |
| 2008/0114743 A1 | 5/2008 | Venkataraman et al. | |
| 2008/0209229 A1 | 8/2008 | Ramakrishnan et al. | |

FOREIGN PATENT DOCUMENTS

| | | |
|---|---|---|
| WO | WO-2004/031931 A1 | 4/2004 |
| WO | WO-2005/033967 A3 | 4/2005 |
| WO | WO-2005/084235 A2 | 9/2005 |

OTHER PUBLICATIONS

Ardissono, L. et al., User Modeling and Recommendation Techniques for Personalized Electronic Program Guides, Personalized Digital Television, Editors: Ardissono, et al., Kluwer Academic Press, 2004.

Dalianis, "Improving search engine retrieval using a compound splitter for Swedish," Abstract of presentation at Nodalida 2005—15th Nordic Conference on Computational Linguistics, Joensuu Finland, May 21-22, 2005. Retrieved Jan. 5, 2006 from http://phon.joensuu.fi/nodalida/abstracts/03.shtml.

Digital Video Broadcasting, http://www.dvb.org (Oct. 12, 2007).

Gadd, Phonix: The Algorith, Program, vol. 24(4), Oct. 1990 (pp. 363-369).

Good, N. et al., Combining Collaborative Filtering with Personal Agents for Better Recommendations, in Proc. of the 16th National Conference on Artificial Intelligence, pp. 439-446, Orlando, Florida, Jul. 18-22, 1999.

International Search Report, International Application No. PCT/US06/25249, mailed Jan. 29, 2008 (2 pages).

International Search Report, International Application No. PCT/US06/33204, mailed Sep. 21, 2007 (2 pages).

International Search Report, International Application No. PCT/US06/40005, mailed Jul. 3, 2007 (4 Pages).

International Search Report, International Application No. PCT/US07/65703, mailed Jan. 25, 2008 (2 pages).

International Search Report, International Application No. PCT/US07/67100, mailed Mar. 7, 2008 (2 pages).

Mackenzie et al., LetterWise: Prefix-based disambiguation for mobile text input, Proceedings of the ACM Symposium on User Interface Software and Technology—UIST2001, pp. 111-120.

Matthom, "Text Highlighting in Search Results", Jul. 22, 2005. Available at www.matthom.com/archive/2005/07/22/text-highlighting-in-search-results; retrieved Jun. 23, 2006. (4 pages).

Mokotoff, Soundexing and Genealogy, Available at http://www.avotaynu.com/soundex.html, retrieved Mar. 19, 2008, last updated Sep. 8, 2007 (6 pages).

Press Release from Tegic Communications, Tegic Communications is awarded patent for Japanese T9(R) text input software from the Japan Patent Office, Oct. 12, 2004. Reteved Nov. 18, 2005 from http://www.tegic.com/press_view.html?release_num=55254242.

Review of Personalization Technologies: Collaborative Filtering vs. ChoiceStream's Attributized Bayesian Choice Modeling, Technology Brief, ChoiceStream Technologies, Cambridge, MA.

Silfverberg et al., Predicting text entry speed on mobile phones, Proceedings of the ACM Conference on Human Factors in Computing System—Chi, 2000. pp. 1-16.

Talbot, David. "Soul of a New Mobile Machine." *Technology Review: The Design Issue* May/Jun. 2007. (pp. 46-53).

Wikipedia's entry for Levenshtein distance (n.d.). Retrieved Nov. 15, 2006 from http://en.wikipedia.org/wiki/Levenshtein_distance.

Written Opinion of the International Searching Authority, International Application No. PCT/US06/25249, mailed Jan. 29, 2008 (4 pages).

Written Opinion of the International Searching Authority, International Application No. PCT/US06/33204, mailed Sep. 21, 2007 (3 pages).

Written Opinion of the International Searching Authority, International Application No. PCT/US06/40005, mailed Jul. 3, 2007 (4 Pages).

Written Opinion of the International Searching Authority, International Application No. PCT/US07/65703, mailed Jan. 25, 2008 (4 pages).

Written Opinion of the International Searching Authority, International Application No. PCT/US07/67100, mailed Mar. 7, 2008 (3 pages).

* cited by examiner

METHOD AND SYSTEM FOR UNIFIED SEARCHING ACROSS AND WITHIN MULTIPLE DOCUMENTS

CROSS-REFERENCE TO RELATED APPLICATIONS

This application claims the benefit under 35 U.S.C. §119 (e) of the following application, the contents of which are incorporated by reference herein:

U.S. Provisional Application No. 60/940,136, entitled Method and System for Unified Search Across and Within Multiple Documents, filed May 25, 2007.

BACKGROUND

1. Field of the Invention

The present invention relates to user interfaces for searching and browsing and, more specifically, to user interfaces for searching within a document and across multiple documents.

2. Discussion of Related Art

Currently, searching within a document and searching across documents requires two separate interfaces. Users typically search across documents using either a search engine, such as Google or a site specific search (such as Wikipedia search, Amazon search, etc.). Users typically search within a document using the functionality provided by web browsers, such as Internet Explorer or Firefox. There has not been a great need from a usability standpoint to combine these two interfaces, particularly on desktop or laptop computers, because they have enough screen space to display both at the same time, a full QWERTY keypad, and easy random access to any point on the screen using a mouse/touch pad interface. The need to display all matches for an input search term is addressed by Google (via a browser add-in) by highlighting the search matches in a document (see FIG. 1)—the user then must visually identify the right section of the document by looking for the highlighted matched locations (which may require the user to scroll through the document).

This approach works well on devices with large displays, but on display constrained devices, the user must expend considerable effort to navigate through pages to find the matches. The Firefox browser's find interface (see prior Art II) reduces the effort to find the matches by navigating to each match sequentially with the touch of an interface button ("Next"). However, the matches can span across pages, making the navigation process cumbersome. The context information surrounding the match in some cases can be more than a page of information, which, in most cases, is too much information to visually scan quickly. This is particularly true on display constrained devices, where a "page" of information is a relatively small amount of text.

To summarize, a common approach of the various search interfaces (e.g. web sites such as Google, Amazon, US Patent Office, and browsers such as Firefox browser, Internet Explorer, etc.), for handling searches within a document and across a document is separating the text input interfaces for searching across the document and for searching within the document. The former is typically done using a search engine or a web site and the latter using a browser search interface applied to the downloaded document. Furthermore, the process of searching within a document is typically a sequential traversal of "within document" matches with surrounding context information associated with each match being the actual document content itself. These interface approaches, while they may be convenient for personal computer devices with large screens and full, unambiguous keyboards, are highly cumbersome on mobile and television-like devices that are input and/or display constrained.

SUMMARY OF THE INVENTION

This invention provides user-interface methods and systems for searching among multiple documents and searching for subsections within individual documents using a single searching interface on an input-constrained user device having a screen and a keypad, the method comprising displaying a text input component, receiving a set of query terms in said text input component, receiving, responsive to the received query terms, a set of document bookmarks and a set of document pointers referring to documents within a widely-distributed computer network, allowing the user to select from among these document bookmarks and pointers, and displaying the selected document beginning at a point within said document, if a document bookmark is selected, or a the beginning of the document, if a document pointer is selected.

Under another aspect of the invention, the document bookmarks are generated by retrieving the contents of the document and inferring its structure.

Under another aspect of the invention, the document bookmarks relate to documents that have been previously selected by the user.

Under another aspect of the invention, the document bookmarks are generated by retrieving the contents of the document and inferring its structure, after the user has selected said document.

Under another aspect of the invention, indicators are displayed adjacent to the displayed document pointers, in order to distinguish the displayed document pointers from the displayed document bookmarks.

Under another aspect of the invention, the keypad of the device may be an overloaded keypad that produced ambiguous text input.

BRIEF DESCRIPTION OF THE DRAWINGS

For a more complete understanding of various embodiments of the present invention, reference is now made to the following descriptions taken in connection with the accompanying drawings in which:

Figure 1:
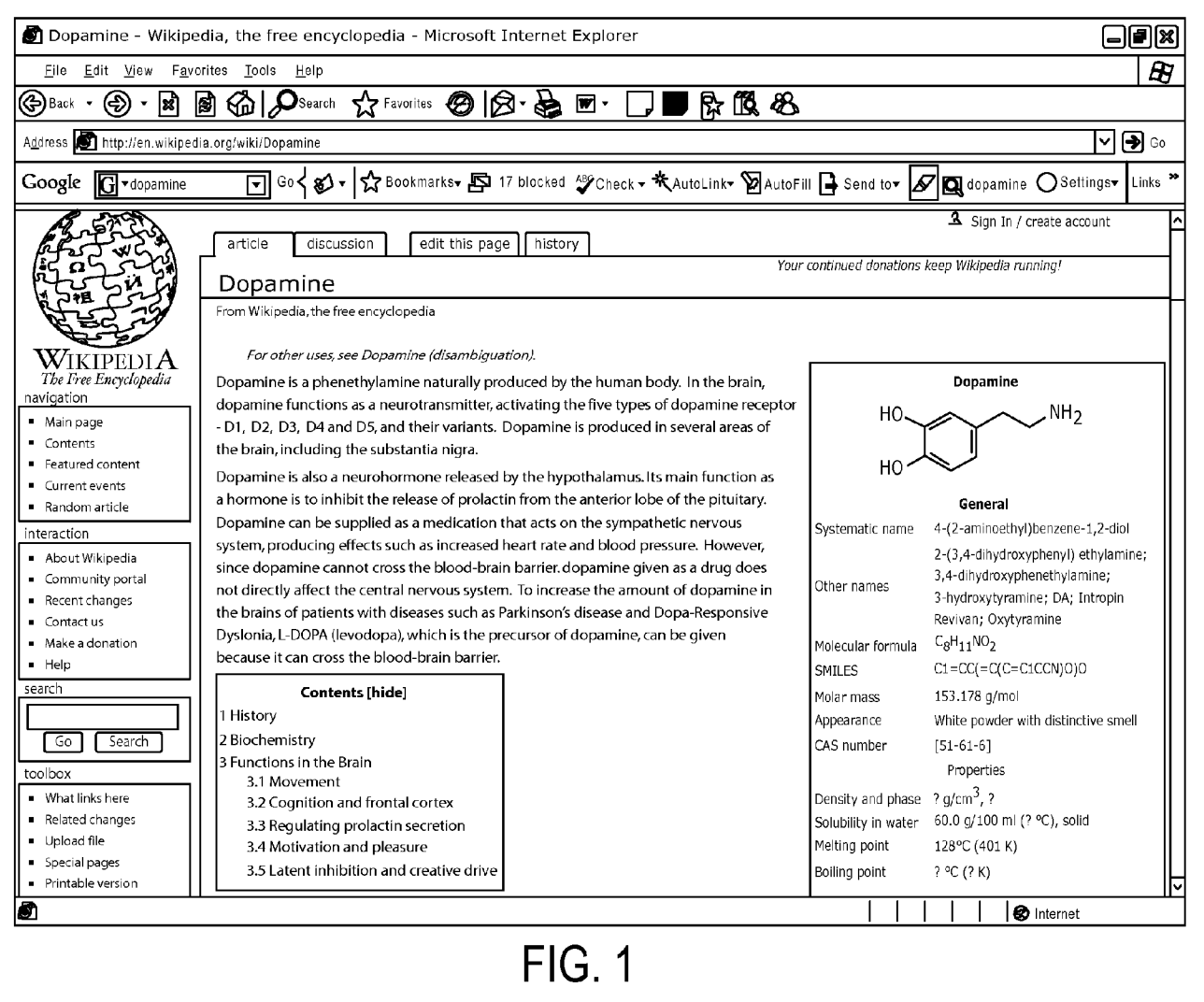

FIG. 1 is a screenshot of a prior art interface.

Figure 2:
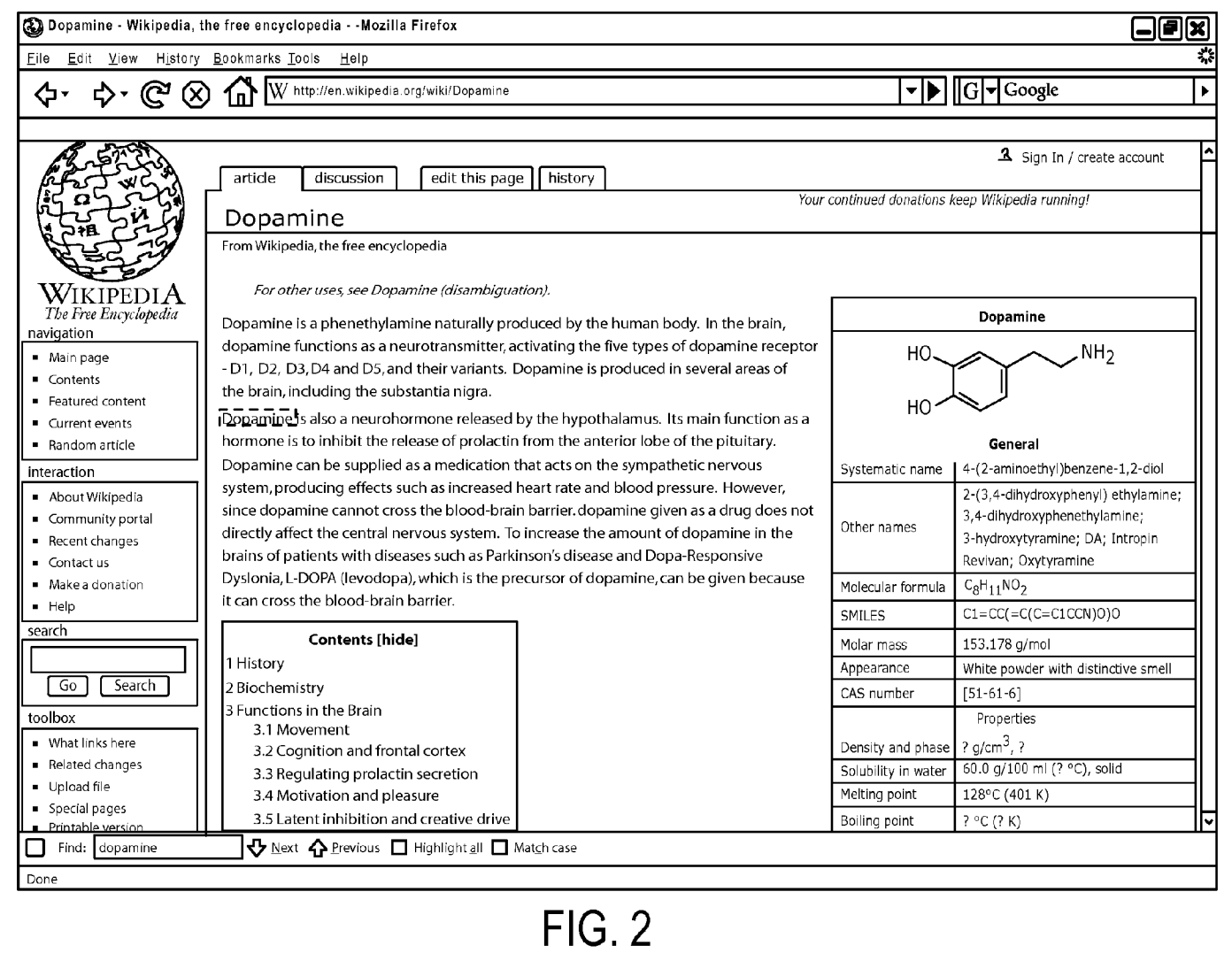

FIG. 2 is a screenshot of a prior art interface.

DETAILED DESCRIPTION

Embodiments of the present invention provide a unified interface that enables a user to search across multiple documents and within a particular document using a single search query input. The interface enables the user to identify possible documents of interest as well as specific sections within those identified documents that are relevant to the user's query input. The interface enables a user to maintain and refine query information as the user moves among searching for documents, searching within a selected document, and viewing the content of the documents. The unified interface operates on an "index" associated with a document, described below, in order to present the most relevant sections of multiple documents in a small display area. Thus, the interface is particularly beneficial to a user of a display-constrained device in the sense that it enables the user to quickly identify sections of interest in various documents.

As used herein, the term "index" is intended to represent any organization of the contents of a document. The index on which the interface operates can be created, for example, by the document author, by another individual, or by a separate document indexing step or process. The index can be a separate entity or can be incorporated in the document itself. For example, an index could simply be headings of a document, or an index could be named anchors within an HTML document. This indexing can be performed in advance, or on-the-fly during the search process. The document may be of any type: standard techniques may be used to parse plain text and HTML documents, and there are many tools that permit on-the-fly extraction of data from binary files in proprietary formats (e.g., Microsoft Word, Adobe PDF, etc.).

Figure 3:
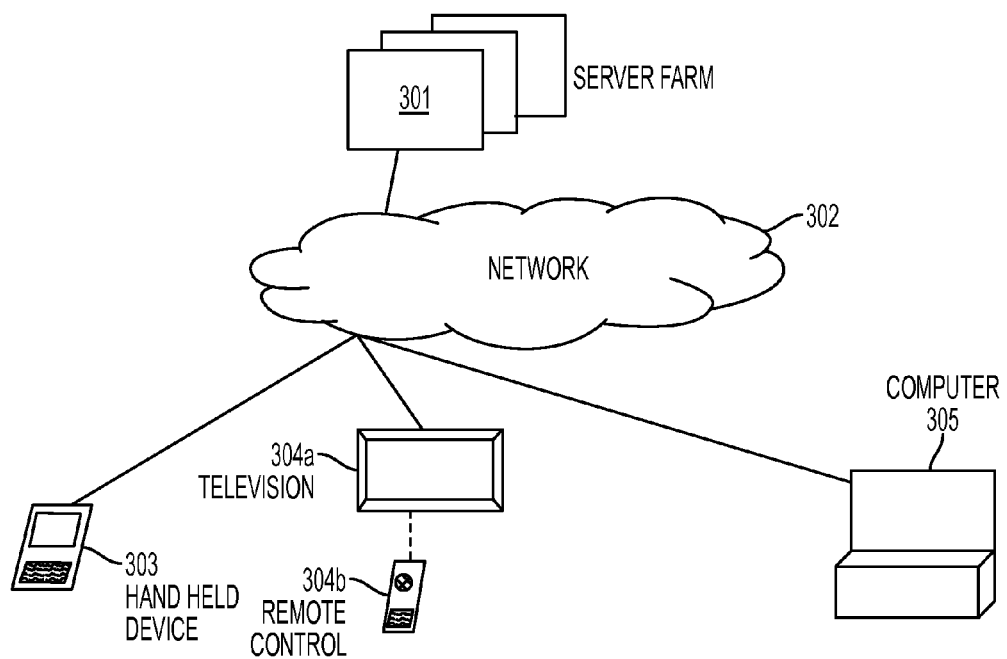
FIG. 3 illustrates an embodiment of a search system where a search is done on a network system and results are returned to a client device.

FIG. 3 illustrates an embodiment of the system using the techniques disclosed herein for performing searches using a wide range of devices. A server farm [301] can serve as the source of search data (units of search data are known as documents) and relevance updates with a network [302] functioning as the distribution framework. The distribution framework may be a combination of wired and wireless connections. Examples of possible networks include cable television networks, satellite television networks, IP-based networks (including IP television networks), wireless CDMA and GSM networks. The search devices could have a wide range of interface capabilities, such as a hand-held device [303] (e.g., a phone or PDA) with a limited display size and a reduced keypad with overloaded keys, a television [304a] coupled with a remote control device [304b] having an overloaded keypad, and a Personal Computer (PC) [305] with a reduced keyboard and a computer display. According to another embodiment of the invention, the search happens locally on the device and results are rendered locally on the user interface.

Figure 4:
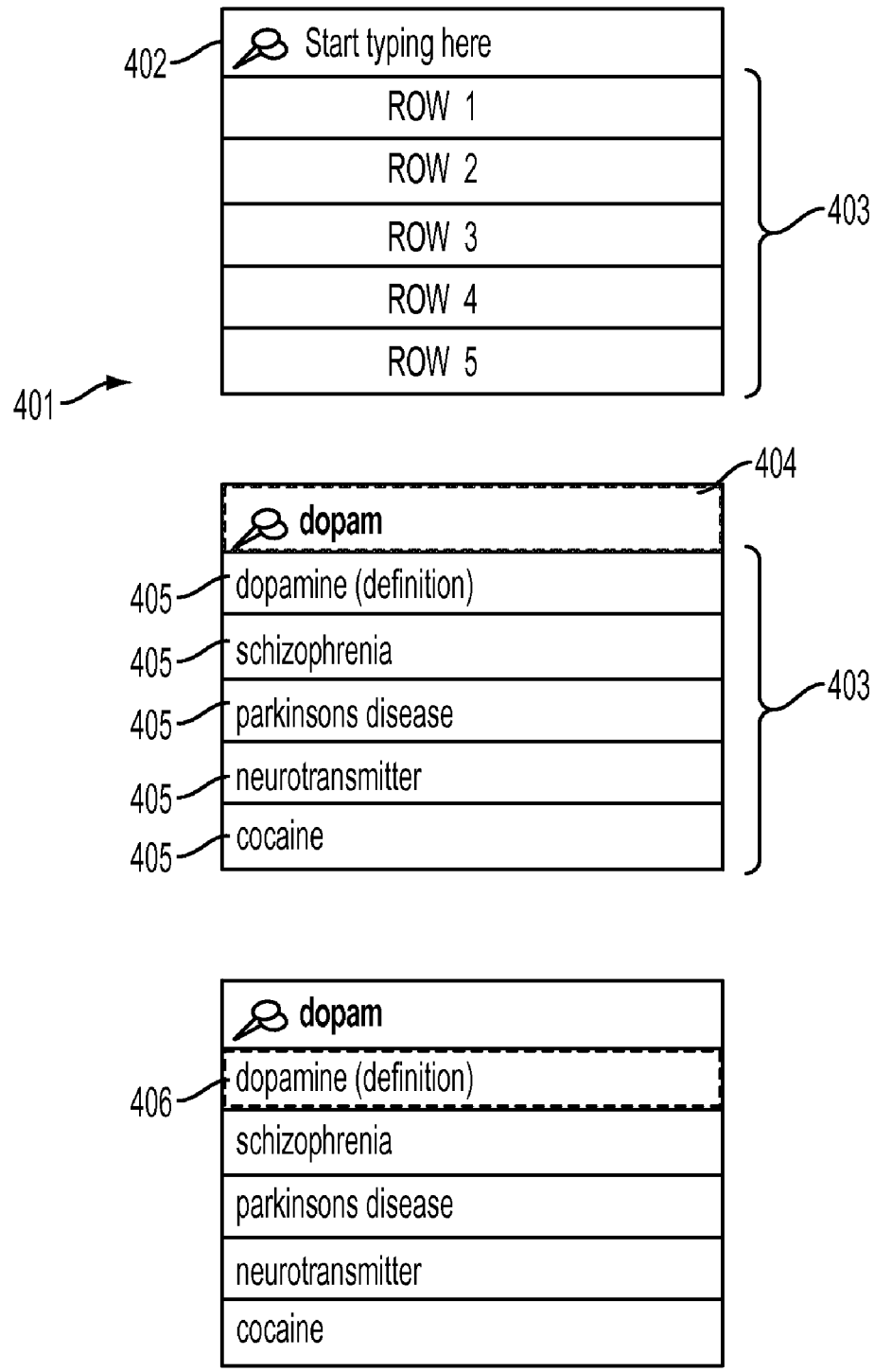
FIG. 4 illustrates an interface for searching and displaying results.

FIG. 4 illustrates a visual presentation of a user interface for performing a search within a document and across documents. This interface can use a variety of search engines, including those known in the art. The interface [401] has a text input portion [402] for accepting user search input characters that constitute the input query. The input method could employ a QWERTY style keypad or a keypad with overloaded keys (i.e., a keypad in which multiple characters and/or numerals are assigned to a single key). The interface can be used with incremental search techniques, in which results are retrieved as each character is typed. Techniques for selecting a set of results responsive to the user's query include, but are not limited to, those disclosed in U.S. patent application Ser. No. 11/235,928, entitled Method and System For Processing Ambiguous, Multi-Term Search Queries, filed Sep. 27, 2005, U.S. patent application Ser. No. 11/136,261, entitled Method and System For Performing Searches For Television Content Using Reduced Text Input, filed May 24, 2005, and U.S. patent application Ser. No. 11/246,432, entitled Method and System For Incremental Search With Reduced Text Entry Where The Relevance of Results is a Dynamically Computed Function of User Input Search String Character Count, filed Oct. 7, 2005, all of which are herein incorporated by reference. However, an incremental search method is not required, as the interface can be used with queries comprising full complete terms, which are dispatched with an explicit send action. The results section [403] presents the results returned from the search engine employed.

For example, when the user enters an incremental search input query "dopam" [404], a search engine connected to the interface [401] returns a set of results [405] matching "dopamine". These results [405] are presented in results section [403]. As described in the applications incorporated above, results can be selected based on descriptive terms and/or metadata associated with the documents.

Figure 5:
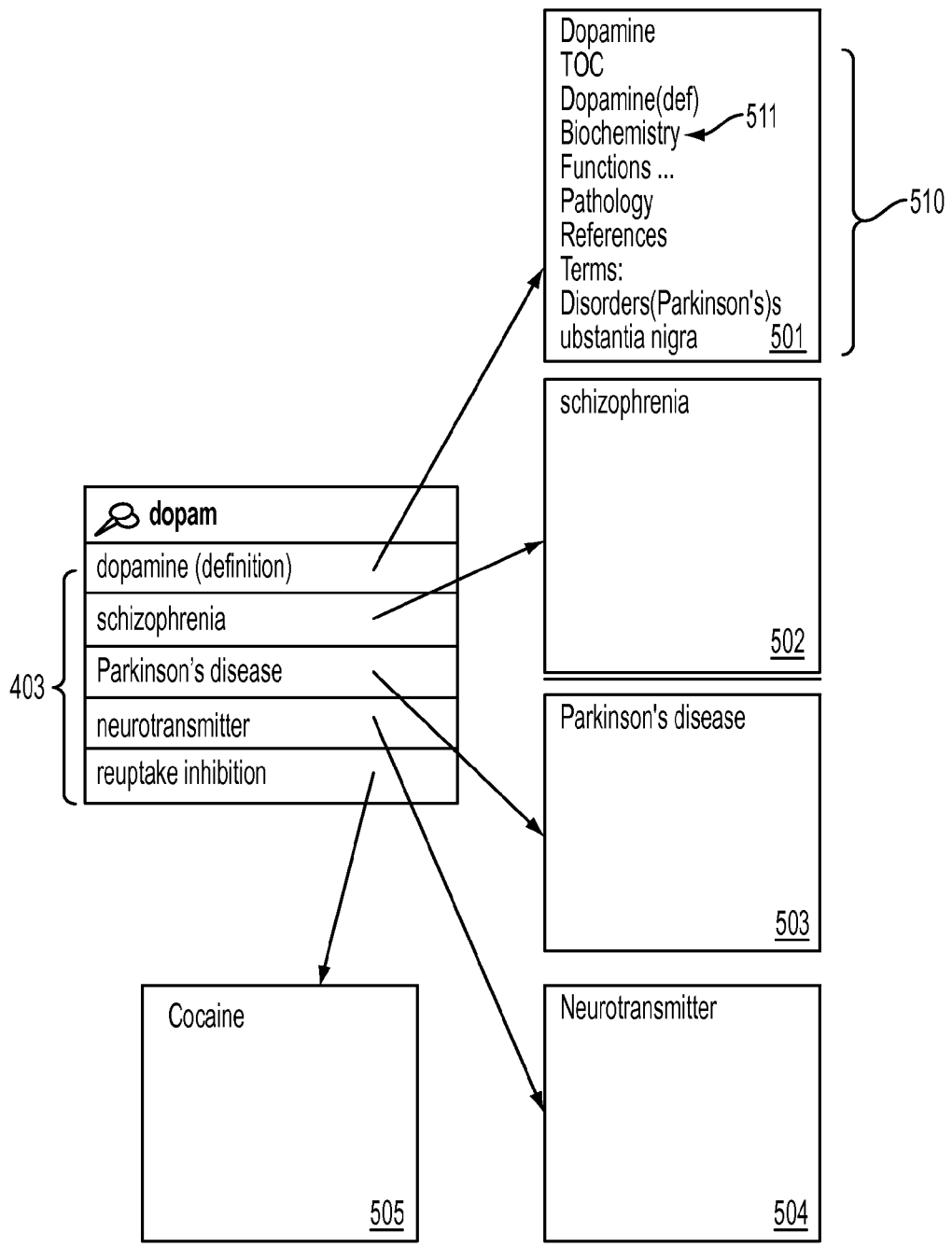
FIG. 5 illustrates the results matching user input and the documents that are being linked to by the result.

FIG. 5 illustrates an expanded representation of the results presented in FIG. 4 for the search query "dopam". Each of the rows in the set of results [403] points to a different document (documents [501-505]) matching the term "dopamine". In this example, document [501] is included in the result set because it has been indexed under the subject of dopamine. While the other documents [502-505] are indexed under subjects other than dopamine, dopamine is a term included in these documents' metadata; thus, these documents are also returned in response to the search. The figure also depicts a listing [510] of the various sections of the document [501], organized according to the index information associated with the document [501].

Referring to FIG. 4, when the user selects a result [406], which corresponds to a particular document [501, FIG. 5], the interface lists the sections [510] of the document [501] that are relevant to the search query term "dopam", which, as explained above, matches the term "dopamine".

Figure 6:
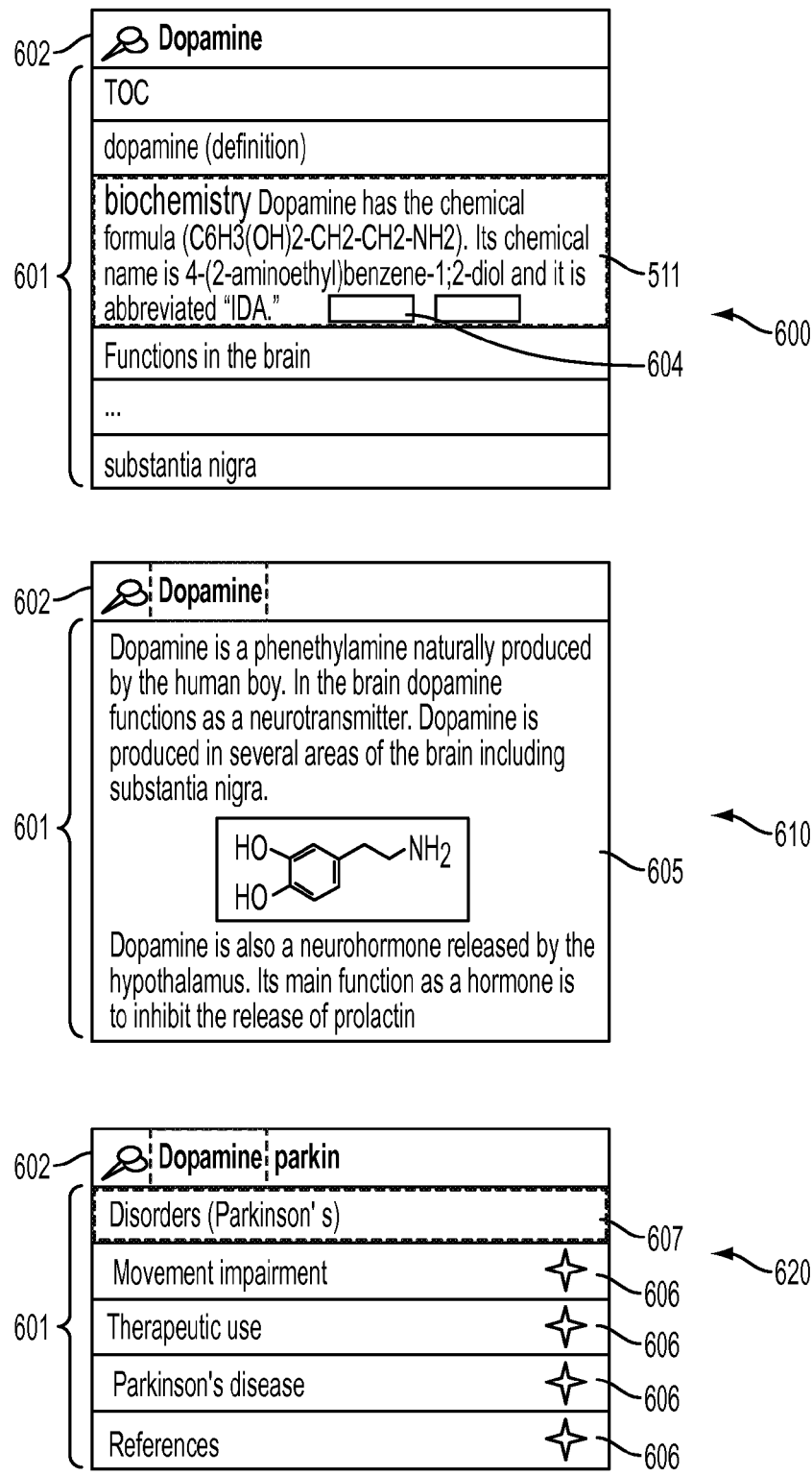
FIG. 6 illustrates a display of all matches within a document and a subsequent incremental search within the context of a selected document.

FIG. 6 illustrates this listing [600], in which results are presented in a content display portion [601]. In this listing, the user query in text input portion [602] is changed to "dopamine" to reflect the current document's subject as indicated by the document's index. This clearly indicates to the user that the user is now viewing content associated with a document having the subject dopamine (i.e., it indicates that the user is within the dopamine context).

Screens 600, 610, and 620 of FIG. 6 illustrate how the unified interface enables the user to search for, select, and view desired sections of a document discovered as described above. When the user navigates to the "biochemistry" section [511] (which is highlighted in the figure) of the document [501], the user can optionally activate a preview feature on the interface device to expand the row dedicated to the biochemistry of dopamine in order to view additional content associated with the biochemistry section of the document [501]. Aspects of this optional metadata expansion feature are described in U.S. Provisional Patent Application No. 60/940,182, entitled Method and System for Search with Reduced Physical Interaction Requirements, filed on May 25, 2007 and incorporated by reference herein.

In this example, the user finds the biochemistry section to be of interest. Thus, the user acts on one of an array of selectable actions [604] to retrieve and view the contents of the biochemistry section of the document [501]. The interface responds by presenting the contents of the document, starting at the biochemistry section [601], in place of the results list portion of the screen. Meanwhile, because the user is still within the same overall document [501], the context has not changed, and thus the text input portion [602] remains set to "dopamine".

The user is then able to read the portion of the document [501] describing the biochemistry of dopamine. Because the interface has presented the entire contents of the document, the user is able to scroll within the document to review other sections of that document. In addition, the interface enables the user to initiate a new search, starting with the context of the current document, namely, the "dopamine" context. Referring to screen [620] of FIG. 6, upon the user beginning to enter additional query text, the interface places the new entry into text input portion [602] along with the existing search term "dopamine" provided by the document context. Thus, the combined query would be "dopamine parkin". The interface would then replace the document contents in content display portion [601] with a set of search results that are relevant to the new combined search query. Had the user deleted the term "dopamine" and begun entering a new term, the interface would query only the search space outside the current document.

In the illustration, the user has entered "parkin", to represent "Parkinson's disease", as an additional search criterion. The interface adds this search term to text input portion [602] and submits the query to the search engine. Again, as described above, this query can be an incremental query.

The search engine searches both the current document [501], as well as the search space outside the current document. Thus, the result set for the new combined query presented in the content display portion [601] includes links to sections of the current document [501] as well as links to new documents. The interface can optionally provide an indication [606] to shown which results are external to the current document. In screen [620], the result "Disorders (Parkinson's)" does not have the indication [606] because it is linked to a section of the document [501] that is relevant to the combined query. By automatically getting results that do not belong to the current document and listing them after the results in the current document, it enables the user to get to his desired result faster.

Figure 7:
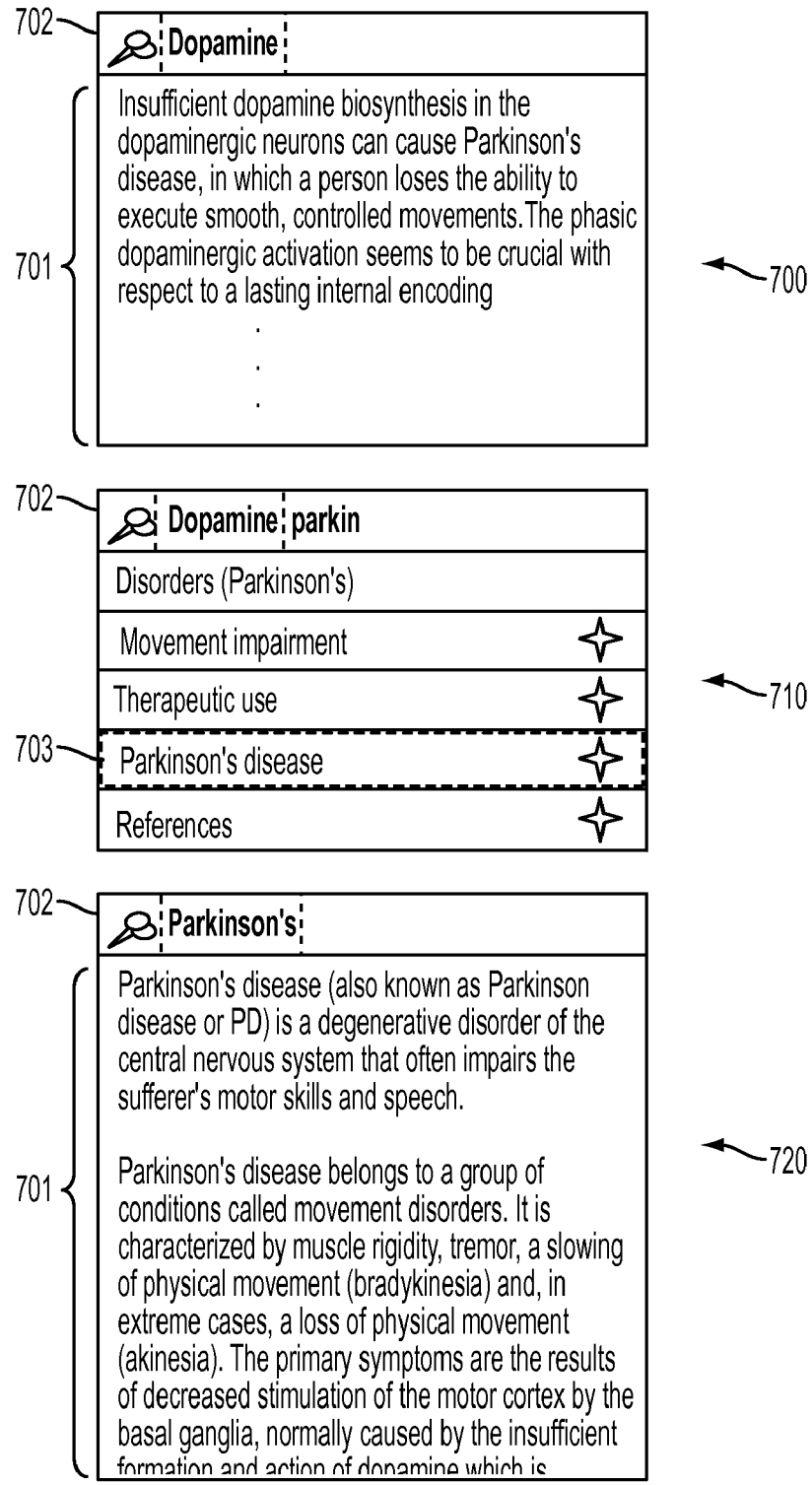
FIG. 7 illustrates a portion of a selected document presented in response to a search within the document; it also illustrates a user choosing another result from a previously presented results list.

Upon the user selecting the result [607], "Disorders (Parkinson's)", the interface presents the contents of the document [501], starting at the "Disorders (Parkinson's)" section, as described above in connection with the biochemistry section. This is illustrated in screen 700 of FIG. 7, in which the content of the document in presented in a content display portion [701]. After reading the portion of the document, the user activates a browse-back function to return to the previous results list, shown in screen 710. This screen retains the previous combination query "dopamine parkin" in the text input portion [702], which corresponds to the text input portion [602] of screen 620 of FIG. 6.

From this screen [710], the user may select an external result [703], "Parkinson's disease", which corresponds to document 503 of FIG. 5. Upon presenting the content of the document [503] in the content display portion [701] of the screen [720], the interface also changes the text input portion [702] to "Parkinson's" because the document has been indexed under the subject of Parkinson's. In this example, the interface presents the contents of the new document [503] directly, without first displaying a result set of the various sections of the document (as the interface had done for the previous document [501]). The factors influencing whether the interface presents the document content directly or presents a result set of sections of the document that match the query text may include (1) the availability of an index of the document, (2) the size and length of the document, (3) the number of sections of the document, and (4) whether the search query terms match the terms contained in the indexed subject of the document. For example, the interface may present the document content directly if an index of sections is not available, if the number of sections is relatively small, or if the document content itself is short.

As for the fourth criterion above, if the user had searched for "Parkinson's" (or an incremental entry that matches "Parkinson's") outside of any document context, the interface would have returned a set of results that included links to documents 501 and 503 because these documents contain content relevant to Parkinson's. However, because the indexed subject for document 501 is "dopamine" rather "Parkinson's", the entries in the result set for document 501 would link to the sections within the document that match the "Parkinson's" query term. However, because the indexed subject for document 503 and the query term match (i.e. both contain "Parkinson's") the entry in the result set for document 503 would link directly to the content of that document. Documents are preferably indexed under only one subject. However, in systems where documents are indexed under a number of subjects, the content of the document will be directly linked if the search terms match any of the subjects associated with the document.

Figure 8:
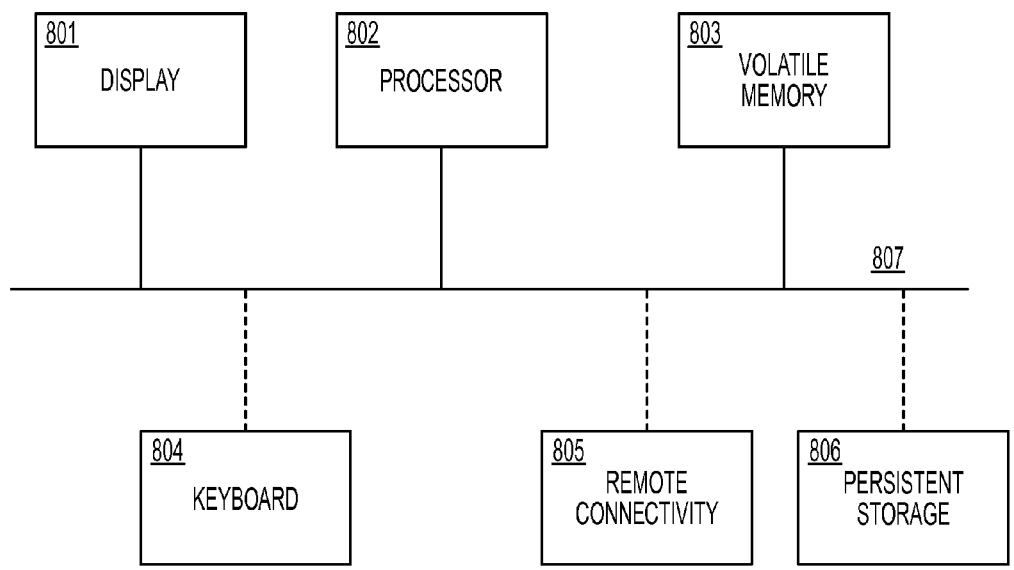
FIG. 8 is a diagram that depicts a client device, according to certain embodiments of the invention.

FIG. 8 is a diagram that depicts the various components of a user device, according to certain embodiments of the invention. The user device communicates with the user via a display [801] and a keyboard [804]. This keyboard may be an overloaded keyboard that produces ambiguous text input. Computation is performed using a processor [802] that stores temporary information in a volatile memory store [803] and persistent data in a persistent memory store [806]. Either or both of these memory stores may hold the computer instructions for the processor to perform the logic described above. The device is operable to connect to a remote system using a remote connectivity module [805].

Thus, implementations of the invention enable the reordering of sections of documents in a way that presents the information most relevant to the search query in an easily accessible manner. Documents whose indexed subjects do not match the query terms, but have sections within them that do match the query terms, are represented so as to enable the user to link directly to the relevant material without having to scan through less relevant sections. As mentioned above, these aspects are particularly helpful when implemented on display constrained devices, on which scanning through large amounts of information is particularly burdensome.

To summarize, embodiments of the present invention provide for a single user interface that enables the user to search across and within documents. The matches within a document are presented in the same manner as those results of searches across multiple documents. This unified interface enables the user to quickly identify matches within a document for a query and select it. Furthermore, the interface seamlessly enables the user to switch between searching within a document and searching across documents simply by clearing the document context displayed in the text input portion of the interface.

It will be appreciated that the scope of the present invention is not limited to the above-described embodiments, but rather is defined by the appended claims; and that these claims will encompass modifications of and improvements to what has been described.

What is claimed is:
1. A user-interface method of searching among multiple documents and searching for subsections within individual documents using a single search interface on an input-constrained user device having a screen and a keypad, the method comprising:

displaying, in a first portion of the screen, a user interface text input component operable to receive search query input entered using the keypad;

receiving search query input entered into the text input component by a user of the device;

receiving, responsive to the received query input, a set of document index section indicators, wherein each document index section indicator uniquely identifies a specific point within a document associated with a subsection within said document, and wherein the subsection associated with the specific point matches at least a portion of the query input;

receiving, responsive to the received query input, a set of document pointers, where each pointer uniquely identifies a document;

displaying, in a second portion of the screen, said document index section indicators and document pointers;

receiving browse actions from the user to browse through and to select one of said document index section indicators and document pointers;

displaying, if a document index section indicator is selected, the identified document, beginning at the identified point within said document so that the user is presented with the subsection within said document that is relatively more relevant to the query input without having to first scan through one or more other subsections within said document that are relatively less relevant to the query input, or displaying, if a document pointer is selected, the beginning of the identified document;

setting, responsive to the document selection, a query context that includes at least one document context associated with the selected document, wherein the document context represents an attribute of the selected document;

subsequent to displaying the selected document, receiving subsequent search query input entered into the text input component by the user of the device; and displaying, responsive to the subsequent search query input and the set query context, a set of document index section indicators for the selected document in the second portion of the screen.

2. The method according to claim 1, further comprising generating each of the document index section indicators by retrieving the contents of a document and inferring the structure of said document.

3. The method according to claim 1, wherein the received document index section indicators point to documents that have been previously selected by the user.

4. The method according to claim 1, further comprising generating each of the document index section indicators by retrieving the contents of a document and inferring the structure of said document, where said document has been previously selected by the user.

5. The method according to claim 1, further comprising displaying indicators adjacent to the displayed document pointers, in order to distinguish the displayed document pointers from the displayed document index section indicators.

6. The method according to claim 1, wherein the keypad is an overloaded keypad.

7. A system for searching among multiple documents and searching for subsections within individual documents using a single search interface on an input-constrained user device having a screen and a keypad, the system comprising:

computer memory store comprising instructions in computer readable form that when executed cause a computer system to:

display, in a first portion of the screen, a user interface text input component operable to receive search query terms entered using the keypad;

receive a set of search query terms entered into the text input component by a user of the device;

receive, responsive to the received query terms, a set of document index section indicators, where each document index section indicator uniquely identifies a specific point within a document associated with a subsection within said document, and wherein the subsection associated with the specific point matches at least a portion of the query input;

receive, responsive to the received query terms, a set of document pointers, where each pointer uniquely identifies a document;

display, in a second portion of the screen, said document index section indicators and document pointers;

receive browse action from the user to browse through and to select one of said document index section indicators and document pointers; and display, if a document index section indicator is selected, the identified document, beginning at the identified point within said document so that the user is presented with the subsection within said document that is relatively more relevant to the query input without having to first scan through one or more other subsections within said document that are relatively less relevant to the query input, or display, if a document pointer is selected, the beginning of the identified document;

set, responsive to the document selection, a query context that includes at least one document context associated with the selected document, wherein the document context represents an attribute of the selected document;

subsequent to displaying the selected document, receive subsequent search query input entered into the text input component by the user of the device; and display, responsive to the subsequent search query input and the set query context, a set of document index section indicators for the selected document in the second portion of the screen.

8. The system according to claim 7, the computer memory store further comprising instructions that cause the computer system to generate each of the document index section indicators by retrieving the contents of a document and inferring the structure of said document.

9. The system according to claim 7, wherein the received document index section indicators point to documents that have been previously selected by the user.

10. The system according to claim 7, the computer memory store further comprising instructions that cause the computer system to generate each of the document index section indicators by retrieving the contents of a document and inferring the structure of said document, where said document has been previously selected by the user.

11. The system according to claim 7, the computer memory store further comprising instructions that cause the computer system to display indicators adjacent to the displayed document pointers, in order to distinguish the displayed document pointers from the displayed document index section indicators.

12. The system according to claim 7, wherein the keypad is an overloaded keypad.

* * * * *